(12) United States Patent
Akasaka

(10) Patent No.: US 10,676,282 B2
(45) Date of Patent: Jun. 9, 2020

(54) BELT-SHAPED MATERIAL CONVEYING APPARATUS CAPABLE OF CORRECTING MEANDERING

(71) Applicant: Chugai Ro Co., Ltd., Osaka-shi (JP)

(72) Inventor: Motofumi Akasaka, Osaka (JP)

(73) Assignee: Chugai Ro Co., Ltd., Osaka-shi (JP)

( * ) Notice: Subject to any disclaimer, the term of this patent is extended or adjusted under 35 U.S.C. 154(b) by 0 days.

(21) Appl. No.: 16/305,412

(22) PCT Filed: Mar. 19, 2018

(86) PCT No.: PCT/JP2018/010718
§ 371 (c)(1),
(2) Date: Nov. 29, 2018

(87) PCT Pub. No.: WO2018/173992
PCT Pub. Date: Sep. 27, 2018

(65) Prior Publication Data
US 2019/0359426 A1   Nov. 28, 2019

(30) Foreign Application Priority Data
Mar. 24, 2017 (JP) .................. 2017-058916

(51) Int. Cl.
*B65G 15/60* (2006.01)
*B65G 69/20* (2006.01)
(Continued)

(52) U.S. Cl.
CPC ............. *B65G 15/60* (2013.01); *B65G 39/16* (2013.01); *B65G 69/20* (2013.01); *F26B 13/12* (2013.01); *B65H 23/032* (2013.01)

(58) Field of Classification Search
CPC ........ B65G 39/16; B65G 15/60; B65G 69/20; B65H 23/022; B65H 23/032; B65H 23/24;
(Continued)

(56) References Cited

U.S. PATENT DOCUMENTS 4,480,777 A * 11/1984 Suzuki ................ B65H 23/032
226/15
4,505,053 A *  3/1985 Andersson ............ F26B 13/104
34/631
(Continued)

FOREIGN PATENT DOCUMENTS

CN    103158249 A    6/2013
DE    691 19 619 T2    10/1996
(Continued)

OTHER PUBLICATIONS

Notification of Reasons for Refusal dated Oct. 4, 2017, of counterpart Japanese Application No. 2017-058916 along with an English translation.
(Continued)

*Primary Examiner* — James R Bidwell
(74) *Attorney, Agent, or Firm* — DLA Piper LLP (US)

(57) ABSTRACT

A belt-shaped material conveying apparatus that supports a belt-shaped material conveyed in a conveying direction to a wind-up roll at a carrying-out side from a feed roll at a carrying-in side between these rolls in a noncontact state by air streams spouted to the belt-shaped material from support pads disposed to face a top surface side and an undersurface side of the belt-shaped material respectively, includes a pair of hydraulic cylinders as tilt means that tilts the support pad in the width direction of the belt-shaped material which crosses the conveying direction of the belt-shaped material.

9 Claims, 7 Drawing Sheets width direction of belt-shaped material

(51) Int. Cl.
  *B65G 39/16* (2006.01)
  *F26B 13/12* (2006.01)
  *B65H 23/032* (2006.01)
(58) Field of Classification Search
  CPC .... B05C 9/14; B05C 13/02; C09J 7/02; F26B 13/12; F26B 3/08; B23Q 15/00
  USPC ..... 198/806, 810.03; 226/15, 97; 34/23, 156
  See application file for complete search history.

(56) References Cited

U.S. PATENT DOCUMENTS

| | | | | |
|---|---|---|---|---|
| 4,787,547 | A | * | 11/1988 | Hella .................... B65H 23/24 101/424.1 |
| 5,152,080 | A | * | 10/1992 | Wimberger ........... F26B 13/104 226/15 |
| 5,272,819 | A | * | 12/1993 | Wimberger ........... F26B 13/104 34/242 |
| 5,921,451 | A | | 7/1999 | Bolza-Schunemann |
| 2016/0059584 | A1 | * | 3/2016 | Albers .................. B41J 11/007 347/102 |

FOREIGN PATENT DOCUMENTS

| | | |
|---|---|---|
| DE | 196 47 050 A1 | 12/1997 |
| EP | 0 441 484 A2 | 8/1991 |
| JP | 57-207128 A | 12/1982 |
| JP | 04-226249 A | 8/1992 |
| JP | 11-165924 A | 6/1999 |
| JP | 2000-503383 A | 3/2000 |
| JP | 2012-153499 A | 8/2012 |
| JP | 2013-071834 A | 4/2013 |
| JP | 2013-092326 A | 5/2013 |
| JP | 2013-144425 A | 7/2013 |
| WO | 97/47934 A1 | 12/1997 |

OTHER PUBLICATIONS

Written Amendment dated Nov. 28, 2017, of counterpart Japanese Application No. 2017-058916 along with an English translation.
Written Argument dated Nov. 28, 2017, of counterpart Japanese Application No. 2017-058916 along with an English translation.

* cited by examiner width direction of belt-shaped material width direction of belt-shaped material width direction of belt-shaped material width direction of belt-shaped material width direction of belt-shaped material

BELT-SHAPED MATERIAL CONVEYING APPARATUS CAPABLE OF CORRECTING MEANDERING

TECHNICAL FIELD

This disclosure relates to a belt-shaped material conveying apparatus capable of correcting meandering of a belt-shaped material while ensuring substantially equal and uniform stress states at a leftside and a rightside in a width direction of the belt-shaped material.

BACKGROUND

As apparatuses that inject air streams to belt-shaped materials to convey the belt-shaped materials in a noncontact state, Japanese Patent Laid-Open Nos. 57-207128 and 11-165924 are known.

The "meandering correction method" of JP '128 relates to a method of correcting meandering of a strip in a width direction in a floating furnace that conveys a belt-shaped metal material, that is, the strip by floating the strip by spraying gas, and in the floating furnace that conveys the strip in a floating state by spraying gas that is blown from a plenum chamber to the strip, the gas after being sprayed to the strip is caused to escape to both the width directions on the leftside and rightside of the strip, and a ratio of the gas flow rates on the left and right is controlled, whereby a balance of the forces which the gas flows exert in the width direction of the strip is adjusted.

The "wrinkle removing device for sheet and meandering correction device" of JP '924 has the problem of providing a wrinkle removing device for the sheet and meandering correction device that can be applied without using a roller to a rectilinearly traveling sheet. The wrinkle removing device uses floating nozzles each including a gas guide surface formed to expand facing a sheet traveling passage, and a discharge port for spouting gas that flows on the gas guide surface from one side edge to the other side edge of the gas guide surface. A left side floating nozzle that causes gas to flow on the gas guide surface to include a moving component in a left direction crossing the sheet traveling passage is disposed at a left side, and a right side floating nozzle that causes gas to flow on the gas guide surface to include a moving component in a right direction is disposed at a right side. The meandering correction device makes a discharge wind velocity at the discharge port of the left side floating nozzle faster compared to the right side flowing nozzle when the sheet meanders to the right side, and makes a discharge wind velocity at the discharge port of the right side floating nozzle faster compared to the left side floating nozzle when the sheet meanders to the left side.

The "floating drying equipment with a meandering correction device" of Japanese Patent Laid-Open No. 2013-71834 has the problem of preventing non-uniformity of a drying state in the width direction of a coating film and defects such as a scratch in the coating film from being generated, and includes the flowing drying device in which two dying chambers that spray gas from nozzle boxes at one side and the other side to both surfaces of the web passage in which one surface is on a coated surface side and the other surface is on a non-coated surface side are disposed adjacent each other, and the meandering correction device disposed between the adjacent drying chambers. The meandering correction device includes two parallel guide rolls that contact the other surface of the web passage, a gas spraying tool for winding formed in the middle of the two guide rolls and sprays gas to the one surface of the curved web passage to be in noncontact with the web passage, and a tilt operation tool that tilts the two guide rolls and the gas spraying tool for winding to the width direction of the web passage.

The "floating drying equipment with a meandering correction device" of Japanese Patent Laid-Open No. 2013-92326 has the problem of providing floating drying equipment that prevents non-uniformity in the drying state in the width direction of the coating film, and defects such as a scratch in the coating film from being generated, and two drying chambers that spray gas from the nozzle boxes at one side and the other side to both surfaces of a web traveling path in which one surface is on the coated surface side and the other surface is on the non-coated surface side are placed adjacent each other. The meandering correction device disposed between the drying chambers includes a plurality of guide rolls disposed parallel to one another to contact the other surface of the web passage, a suction tool that brings the gap between the adjacent guide rolls into a suction state, a gas spraying tool for winding that sprays gas to the one surface of the web passage from outside of the one surface of the web passage and forms a winding region along the outer circumferential surfaces of the guide rolls in the web passage to be in noncontact with the web passage, and a tilt operation tool that tilts these guide rolls, the suction tool and the air spraying tool for winding with respect to a left-right direction.

In JP '128, meandering of the strip is corrected from the left and right in the horizontal direction by controlling the ratio of the gas flow rates on the left and right. In JP '924, meandering of the sheet is corrected from the left and right in the horizontal direction by changing the discharge wind velocities on the left and right. In each of JP '834 and JP '326, meandering is corrected by tilting in the horizontal surface of the web passage by the tilt operation tool which tilts in the width direction of the web passage, or tilts to the left-right direction in the web passage.

In each of JP '128, JP '924, JP '834 and JP '326, when the belt-shaped material which is conveyed or caused to travel along the horizontal surface meanders to the left and/or right in the width direction of the belt-shaped material, correction is performed by causing any external force such as spraying of the gas to correct meandering and a discharge wind velocity or a tilt operation to act in the horizontal surface so that on the left and right in the width direction of the belt-shaped material, the stress state becomes non-uniform by the external force which is caused to act such that the tensile force generated at the left side in the width direction becomes extremely large with respect to the tensile force generated at the right side in the width direction of the belt-shaped material, for example, and there is the problem that the property of the belt-shaped material which is produced differs at the left and right in the width direction of the belt-shaped material.

It could therefore be helpful to provide a belt-shaped material conveying apparatus capable of correcting meandering of the belt-shaped material while ensuring substantially equal and uniform stress states at a leftside and a rightside in a width direction of the belt-shaped material.

SUMMARY

I provide a belt-shaped material conveying apparatus that supports a belt-shaped material conveyed in a conveying direction to a carrying-out side from a carrying-in side in a noncontact state by air streams spouted to the belt-shaped material from support pads disposed to face a front surface side and a back surface side of the belt-shaped material respectively, including tilt means that tilts at least any one of the support pads in a width direction of the belt-shaped material crossing the conveying direction of the belt-shaped material, wherein, in the support pad, a pair of gas ducts placed at both sides in the width direction of the belt-shaped material and supply gas to the support pad connect to both sides in a width direction of the support pad, and the tilt means connects to undersurfaces of the gas ducts.

REFERENCE SIGNS LIST

Figure 1:
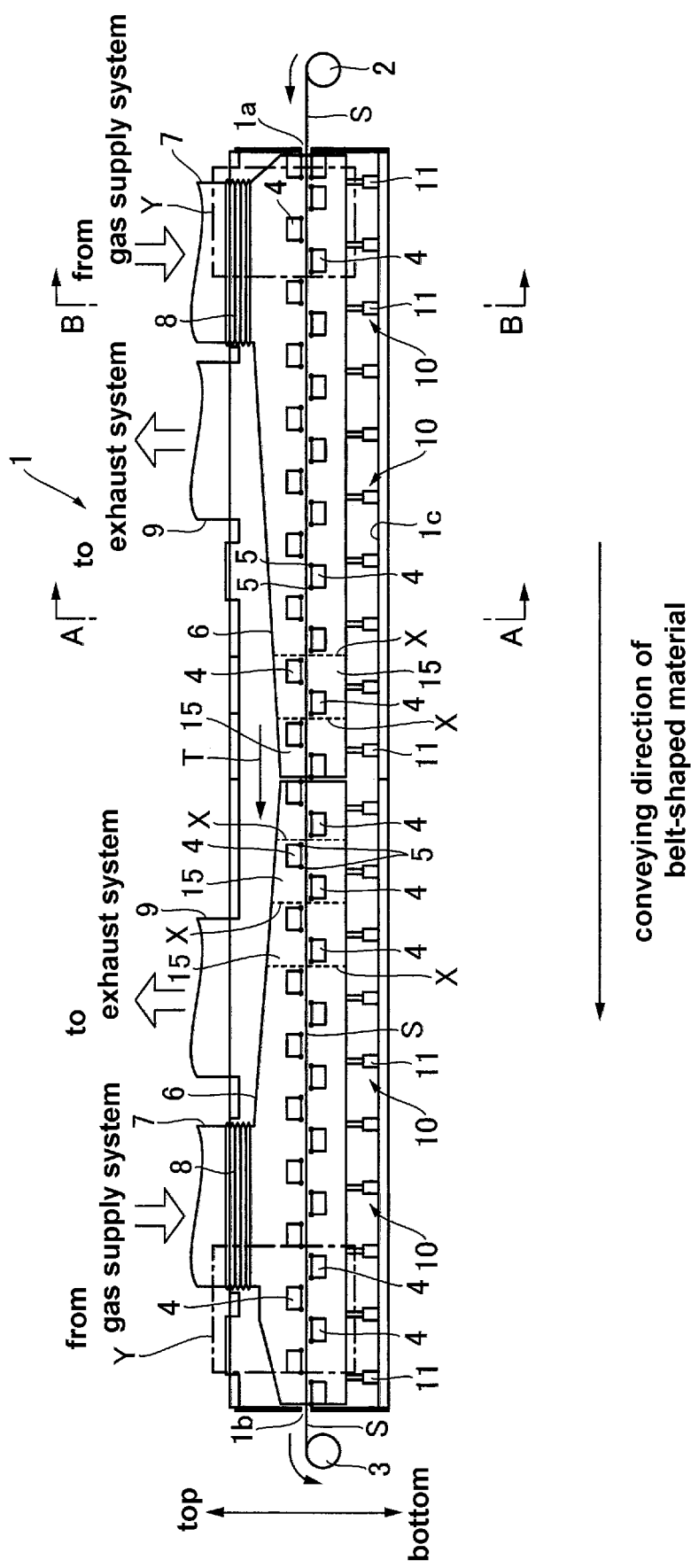
FIG. 1 is a schematic side sectional view of a conveying apparatus to which a belt-shaped material conveying apparatus capable of correcting meandering is applied.0000

1 Heat treatment furnace
1a Inlet port
1b Outlet port
1c Furnace floor
1d Hole
2 Feed roll
3 Wind-up roll
4 Support pad
5 Nozzle
6 Gas duct
7 Gas supply pipe
8 Expansion joint
9 Exhaust pipe
10 Tilt means
11 Hydraulic cylinder
11a Rotary joint
12 Rotation support point
13 Lever
14 Bellows
15 Support pad module
D Displacement
S Belt-shaped material
T Conveying direction

DETAILED DESCRIPTION

I provide a belt-shaped material conveying apparatus that supports a belt-shaped material which is conveyed in a conveying direction to a carrying-out side from a carrying-in side in a noncontact state by air streams that are spouted to the belt-shaped material from support pads disposed to face a front surface side and a back surface side of the belt-shaped material respectively, and includes tilt means that tilts at least any one of the support pads in a width direction of the belt-shaped material, which crosses the conveying direction of the belt-shaped material, wherein in the support pad, a pair of gas ducts placed at both sides in the width direction of the belt-shaped material and supply gas to the support pad are connected to both sides in a width direction of the support pad, and the tilt means is provided to connect to undersurfaces of the gas ducts.

The tilt means is included by only the support pad at the carrying-in side, which is positioned closely to the carrying-in side and the support pad at the carrying-out side, which is positioned closely to the carrying-out side.

The tilt means is configured by a pair of force applying means that displaces the support pad in opposite directions each other at both sides in the width direction of the belt-shaped material.

The tilt means is configured by a rotation support point that rotatably supports the support pad at one side in the width direction of the belt-shaped material, and force applying means that displaces the support pad at the other side in the width direction of the belt-shaped material to rotate the support pad around the rotation support point.

The gas ducts are provided by being divided along the conveying direction of the belt-shaped material, the gas ducts connect to each other by an expansion joint, and the respective gas ducts connect to a plurality of the support pads.

A support pad module is configured by setting at least a pair of the support pads facing a front surface side and a back surface side of the belt-shaped material as one set, and by the gas ducts being individually connected to these respective sets, along the conveying direction of the belt-shaped material, and the gas ducts of the support pad modules adjacent to each other are connected with an expansion joint.

In the belt-shaped material conveying apparatus capable of correcting meandering, meandering of the belt-shaped material can be corrected while substantially equal and uniform stress states are ensured at the left and right in the width direction of the belt-shaped material. In more detail, the tilt means that tilts at least any one of the support pads in the width direction of the belt-shaped material crossing the conveying direction of the belt-shaped material is included, a pair of gas ducts placed at both sides in the width direction of the belt-shaped material and supply gas to the support pad are connected to both sides in the width direction of the support pad, and the tilt means is provided to connect to the undersurfaces of the gas ducts so that the meandering correction function can be incorporated into the conveying apparatus by an easy alteration by installation of the tilt means in the gas duct with a simple structure without requiring change of the support pad.

Figure 3:
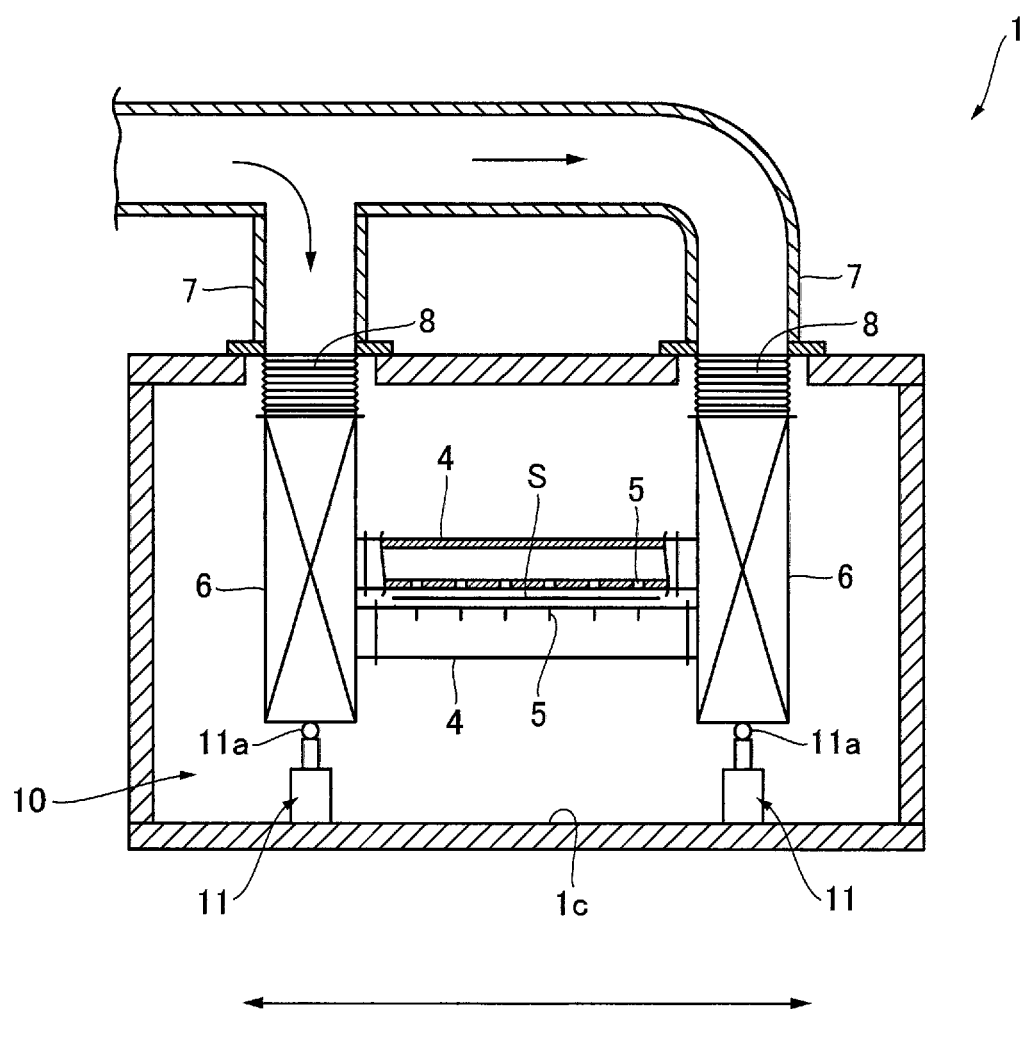
FIG. 3 is a sectional view on arrow taken along line B-B in FIG. 1, and illustrates a preferable example of the belt-shaped material conveying apparatus capable of correcting meandering.
Figure 4:
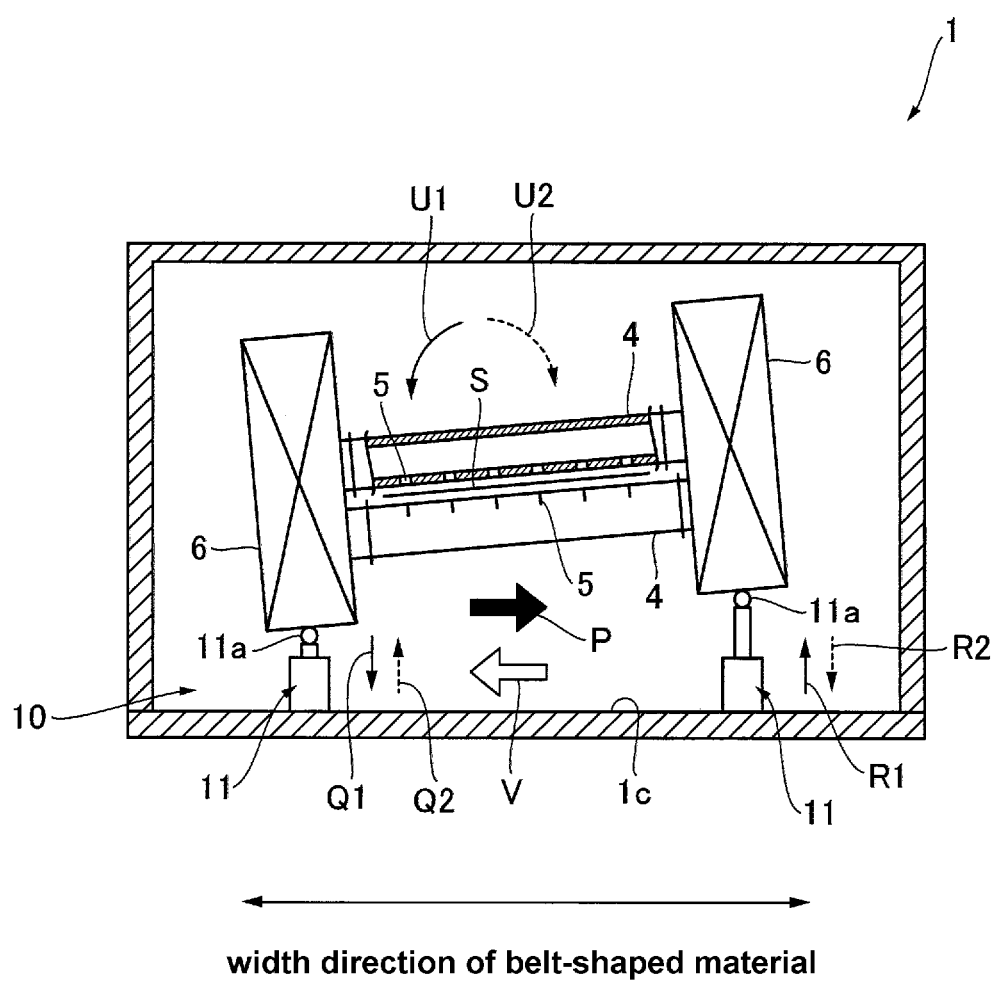
FIG. 4 is an explanatory view that corresponds to FIG. 2, and illustrates a state of meandering correction.

Hereinafter, a preferred example of a belt-shaped material conveying apparatus capable of correcting meandering will be described in detail with reference to the accompanying drawings. FIG. 1 is a schematic side sectional view of the conveying apparatus to which the belt-shaped material conveying apparatus capable of correcting meandering is applied, FIG. 2 is a sectional view on arrow taken along line A-A in FIG. 1, FIG. 3 is a sectional view on arrow taken along line B-B in FIG. 1, and FIG. 4 is an explanatory view that illustrates a state of meandering correction and corresponds to FIG. 2.

Figure 2:
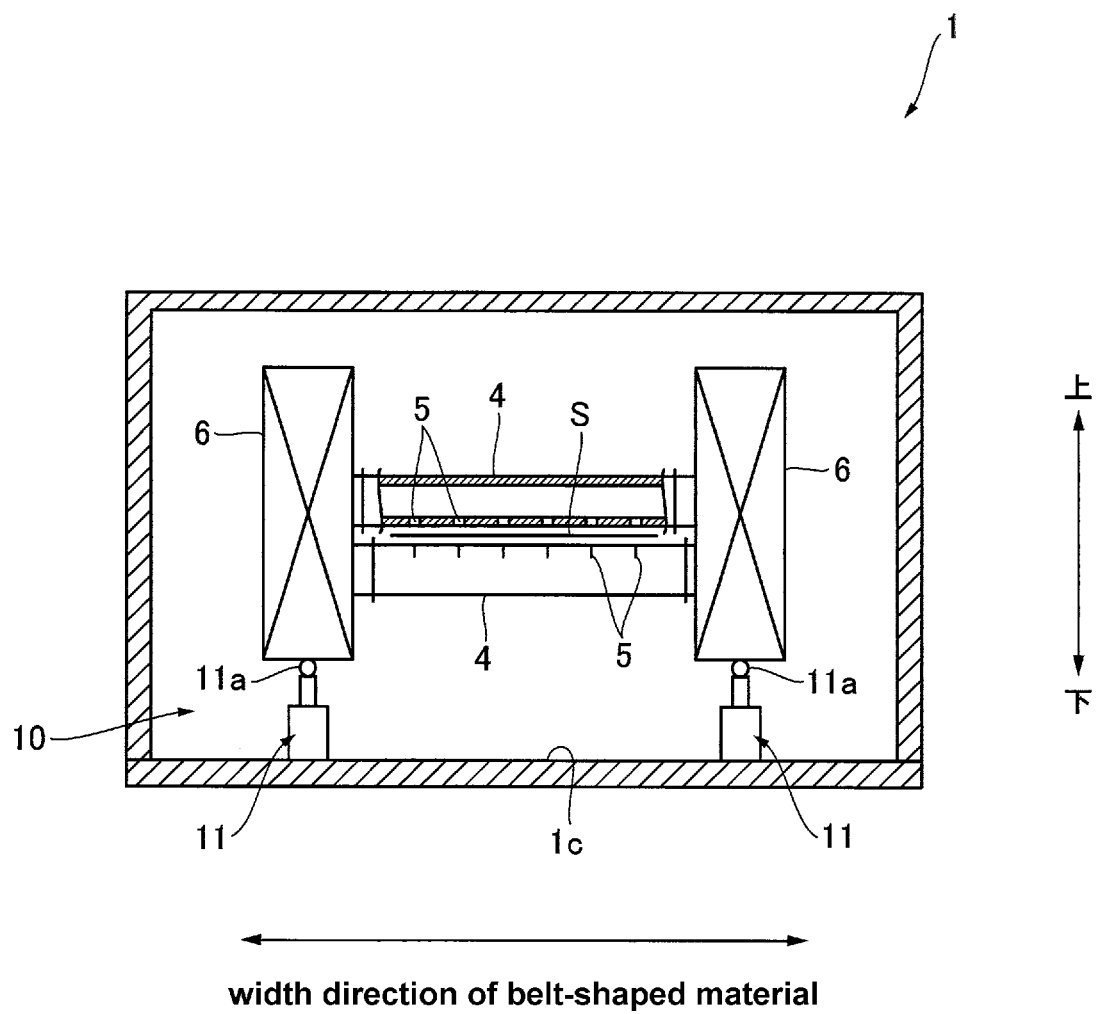
FIG. 2 is a sectional view on arrow taken along line A-A in FIG. 1, and illustrates a preferable example of the belt-shaped material conveying apparatus capable of correcting meandering.

In this example, a furnace 1 for thermally treating a belt-shaped material such as an aluminum sheet and an electromagnetic steel sheet is illustrated as illustrated in FIGS. 1 and 2, as an example of equipment to which the belt-shaped material conveying apparatus capable of correcting meandering is applied.

A belt-shaped material S is fed from a feed roll 2 at a carrying-in side provided at an inlet port 1a side of the heat treatment furnace 1, is fed into the furnace 1 via an inlet port 1a of the heat treatment furnace 1, and is thermally treated in the heat treatment furnace 1, after which, the belt-shaped material S is fed to the outside of the furnace 1 via an outlet port 1b of the heat treatment furnace 1, and is wound up by a wind-up roll 3 at a carrying-out side, which is provided at an outlet port 1b side of the heat treatment furnace 1. The configuration is only an example, and in the front and rear of the heat treatment furnace 1, other working devices and the like may be provided.

Inside the heat treatment furnace 1, a plurality of support pads 4 that guide the belt-shaped material S which is conveyed in a conveying direction T from the feed roll 2 to the wind-up roll 3 while supporting the belt-shaped material S are placed to be positioned between the feed roll 2 and the wind-up roll 3 at the inlet port 1a side and the outlet port 1b side. The belt-shaped material S is conveyed sideways in a substantially horizontal state between the feed roll 2 and the wind-up roll 3, for example.

As for the support pads 4, the support pads 4 at an upper side disposed above the belt-shaped material S to face a top surface side as a front surface side of the belt-shaped material S which is conveyed in the horizontal state from above the top surface side, and the support pads 4 at a lower side disposed below the belt-shaped material S to face an undersurface side as a back surface side of the belt-shaped material S from below the lower surface side are placed alternately to be positioned at both upper and lower sides with respect to the belt-shaped material S. That is, the belt-shaped material S is conveyed to pass between the support pads 4 at the upper side and the support pads 4 at the lower side.

When the belt-shaped material S is conveyed vertically in a substantially vertical state, the support pads 4 are alternately placed at both left and right sides in a horizontal direction of the belt-shaped material S, with respect to the belt-shaped material S.

The respective support pads 4 spout air streams toward the belt-shaped material S from the respective support pads 4. Specifically, as shown in FIGS. 1 and 2, the support pad 4 has a rectangular planar outline contour with a width dimension of the support pad 4 being larger than a width dimension of the belt-shaped material S in a direction crossing the conveying direction T, is formed into a box shape with a proper depth dimension, and configured so that a plurality of nozzles 5 that spout air streams toward the belt-shaped material S are arranged in the width direction of the belt-shaped material S to face the belt-shaped material S. The nozzle 5 may be in a slit form along the width direction of the belt-shaped material S.

The nozzles 5 spout air streams to the belt-shaped material S throughout the entire width of the belt-shaped material S, and thereby the belt-shaped material S is supported in a floating state at substantially equal spaces from the support pads 4. That is, the support pads 4 at the lower side spout air streams toward the undersurface side of the belt-shaped material S from the nozzles 5, and thereby support the belt-shaped material S in a noncontact state above the support pads 4 at the lower side.

The support pads 4 at the upper side spout air streams toward the top surface side of the belt-shaped material S from the nozzles 5, contrary to the support pads 4 at the lower side, and thereby support the belt-shaped material S in a noncontact state below the support pads 4 at the upper side (support a reaction force of a pressing action to the support pads 4 side at the lower side). Accordingly, the belt-shaped material S is conveyed in the conveying direction T while being supported in a floating state separated from the support pads 4 by the air streams spouted from the support pads 4 in positions of the respective support pads 4.

To the support pad 4, a pair of gas ducts 6 placed at both sides in the width direction of the belt-shaped material S connect to supply gas such as air to the nozzles 5. The gas ducts 6 are placed inside the heat treatment furnace 1. In this example, the gas ducts 6 are provided by being divided into two at the inlet port 1a side and the outlet port 1b side of the heat treatment furnace 1, along the conveying direction T of the belt-shaped material S, respective pairs of gas ducts 6 which are divided into two respectively connect to a plurality of support pads 4. In the illustrated example, the long heat treatment furnace 1 is shown so that the case in which two of the gas ducts 6 are provided by dividing the gas duct 6 is shown, but the single gas duct 6 may be provided from the inlet port 1a to the outlet port 1b, or the gas duct 6 may be provided by being divided into three or more as a matter of course.

To a pair of gas ducts 6 at both sides in the width direction of the belt-shaped material S, gas supply pipes 7 of a gas supply system (not illustrated) which is provided outside of the heat treatment furnace 1 are connected as illustrated in FIG. 3, gas is supplied into the respective gas ducts 6 from the gas supply pipes 7, the gas which is supplied to the gas ducts 6 is supplied into the box shaped support pad 4, and the gas supplied into the support pad 4 is spouted from the nozzles 5.

In the illustrated example, the gas supplied from the gas supply pipe 7 to the gas duct 6 at the inlet port 1a side of the heat treatment furnace 1 is collectively supplied to the plurality of support pads 4 placed at the inlet port 1a side, and the air supplied from the gas supply pipe 7 to the gas duct 6 at the outlet port 1b side is collectively supplied to the plurality of support pads 4 placed at the outlet port 1b side. The gas duct 6 and the gas supply pipe 7 connect to each other via an expansion joint 8 such as a bellows and an accordion-shaped joint to absorb movement of the gas duct 6.

In the heat treatment furnace 1, exhaust pipes 9 of an exhaust system (not illustrated) that recovers the gas spouted from the nozzles 5 and discharging the gas to outside of the heat treatment furnace 1 are connected to appropriate spots. In the illustrated example, the gas is discharged from the two exhaust pipes 9 placed between the gas supply pipe 7 of the gas ducts 6 provided at the inlet port 1a side of the heat treatment furnace 1, and the gas supply pipe 7 of the gas ducts 6 provided at the outlet port 1b side, and the discharged gas is circulated and supplied to the gas supply system from the exhaust system, or discharged without being circulated.

The belt-shaped material conveying apparatus capable of correcting meandering includes tilt means 10 that tilt the support pad 4 in the width direction of the belt-shaped material S crossing the conveying direction T of the belt-shaped material S. The tilt means 10 is provided at a pair of gas ducts 6 connected to both sides in the width direction of the support pad 4.

In this example, the tilt means 10 is configured by hydraulic cylinders 11 as a pair of force applying means with lower ends fixed to a furnace floor 1c of the heat treatment furnace 1 respectively, and respective upper ends connected to respective undersurfaces of the pair of gas ducts 6 via rotary joints 11a. The force applying means may be a jack or the like without being limited to the hydraulic cylinder 11.

A pair of hydraulic cylinders 11 displace the support pad 4 in opposite directions to each other at both sides in the width direction of the belt-shaped material S via the pair of gas ducts 6 to which the upper ends of the pair of hydraulic cylinders 11 are connected. In detail, the hydraulic cylinders 11 are provided by being raised substantially perpendicularly from the furnace floor 1c at equidistant positions from both ends in the width direction of the support pad 4 along the width direction of the belt-shaped material S, and a plurality of hydraulic cylinders 11 are provided by being arranged along the conveying direction to support these gas ducts 6 in the conveying direction of the belt-shaped material S.

With respect to an extension stroke of one of the pair of hydraulic cylinders 11, the other one is operated with a substantially equal contraction stroke, whereby the support pad 4 is tilted to tilt in the width direction of the belt-shaped material S, and the surface of the support pad 4 facing to the belt-shaped material S is brought into a tilting state. With respect to the pair of gas ducts 6, a plurality of hydraulic cylinders 11 arranged in the conveying direction of the belt-shaped material S perform the same movement at the same time. The surface of the support pad 4 facing the belt-shaped material S is tilted, whereby the belt-shaped material S supported by the air stream spouted from the support pad 4 also tilts, and a twist occurs to the belt-shaped material S along the surface of the support pad 4.

In a spot where the gas duct 6 and the gas supply pipe 7 are connected, movement of the gas duct 6 by the hydraulic cylinder 11 is absorbed by the expansion joint 8 as illustrated in FIG. 3.

An operation of the belt-shaped material conveying apparatus capable of correcting meandering will be described. As illustrated in FIG. 1, the belt-shaped material S is conveyed in the heat treatment furnace 1 to the wind-up roll 3 from the feed roll 2 while being supported by the plurality of support pads 4 in a noncontact state.

The conveyed belt-shaped material S may be displaced (illustrated by an arrow D in the drawing) toward the width direction of the belt-shaped material S crossing the conveying direction T with respect to the feed roll 2 or the wind-up roll 3 due to various causes such as a situation of release from the feed roll 2, or contact with the wind-up roll 3, and cause meandering.

When meandering occurs, the hydraulic cylinders 11 are operated to cause movement to the support pad 4 as illustrated in FIG. 4. For example, when the belt-shaped material S causes a shift to the right direction (shown by a black arrow P in the drawing) and meanders in FIG. 4, a left side in the width direction of the support pad 4 is lowered (shown by a solid line arrow Q1 in the drawing) so that a twist for moving the belt-shaped material S to the left direction which is an opposite side to the right side in the width direction which the belt-shaped material S approaches is generated in the belt-shaped material S, the hydraulic cylinder 11 is operated to make the right side in the width direction of the support pad 4 high (shown by a solid line arrow R1 in the drawing) in accordance with this, and the support pad 4 is tilted (shown by a solid line arrow U1 in the drawing).

When the support pad 4 is tilted in this way, a shift to the left side in the width direction occurs to the belt-shaped material S (shown by a white arrow V in the drawing) by the force of the twist by the pair of hydraulic cylinders 11, coupled with the own weight of the belt-shaped material S. The belt-shaped material S is displaced to the left direction, and thereby the meandering state is gradually ended.

When meandering is corrected by operating the pair of hydraulic cylinders 11, only a shift to the left direction is caused in the belt-shaped material S by the twist by tilt of the support pad 4 to the width direction of the belt-shaped material S so that in the width direction on the left and right of the belt-shaped material S, tensions by the feed roll 2 and the wind-up roll 3 only act substantially, and substantially equal and uniform stress states are ensured.

When the twist to move the belt-shaped material S in the right direction is generated, the right side in the width direction of the support pad 4 is lowered (shown by a broken line arrow R2 in the drawing), on the contrary to the above, and in accordance with this, the hydraulic cylinder 11 is operated to raise the left side in the width direction of the support pad 4 (shown by a broken line arrow Q2 in the drawing), and the support pad 4 is tilted (shown by a broken line arrow U2 in the drawing), whereby the belt-shaped material S is displaced to the right direction, and the meandering state is gradually ended. In this case, the stress states in the width direction on the left and right of the belt-shaped material S are also made substantially equal and uniform.

The belt-shaped material conveying apparatus capable of correcting meandering described above is the belt-shaped material conveying apparatus that supports the conveyed belt-shaped material S in the conveying direction T to the wind-up roll 3 at the carrying-out side from the feed roll 2 at the carrying-in side in the noncontact state by the air streams spouted to the belt-shaped material S from the plurality of support pads 4 disposed to face the top surface side and the undersurface side of the belt-shaped material S, between the rolls 2 and 3, and includes the tilt means 10 that tilts the support pad 4 in the width direction of the belt-shaped material S crossing the conveying direction T of the belt-shaped material S so that meandering of the belt-shaped material S can be corrected by the twist generated in the belt-shaped material S while ensuring substantially equal and uniform stress states at the left and right in the width direction of the belt-shaped material S.

The tilt means 10 is configured by the pair of hydraulic cylinders 11 that displace the support pad 4 in the opposite directions each other at both sides in the width direction of the belt-shaped material S, and therefore has an extremely simple structure, and can correct meandering with an easy control operation.

The pair of gas ducts 6 placed at both sides in the width direction of the belt-shaped material S and supply gas to the support pad 4 connect to the support pad 4, and the tilt means 10 is provided at the gas ducts 6 so that a meandering correction function can be incorporated into the conveying apparatus by an easy alteration by installation of the tilt means 10 to the gas ducts 6 with a simple structure without requiring change of the support pad 4.

The gas duct 6 connects to the plurality of support pads 4 so that the plurality of support pads 4 that support the belt-shaped material S can be tilted collectively, and meandering can be corrected efficiently.

Figure 5:
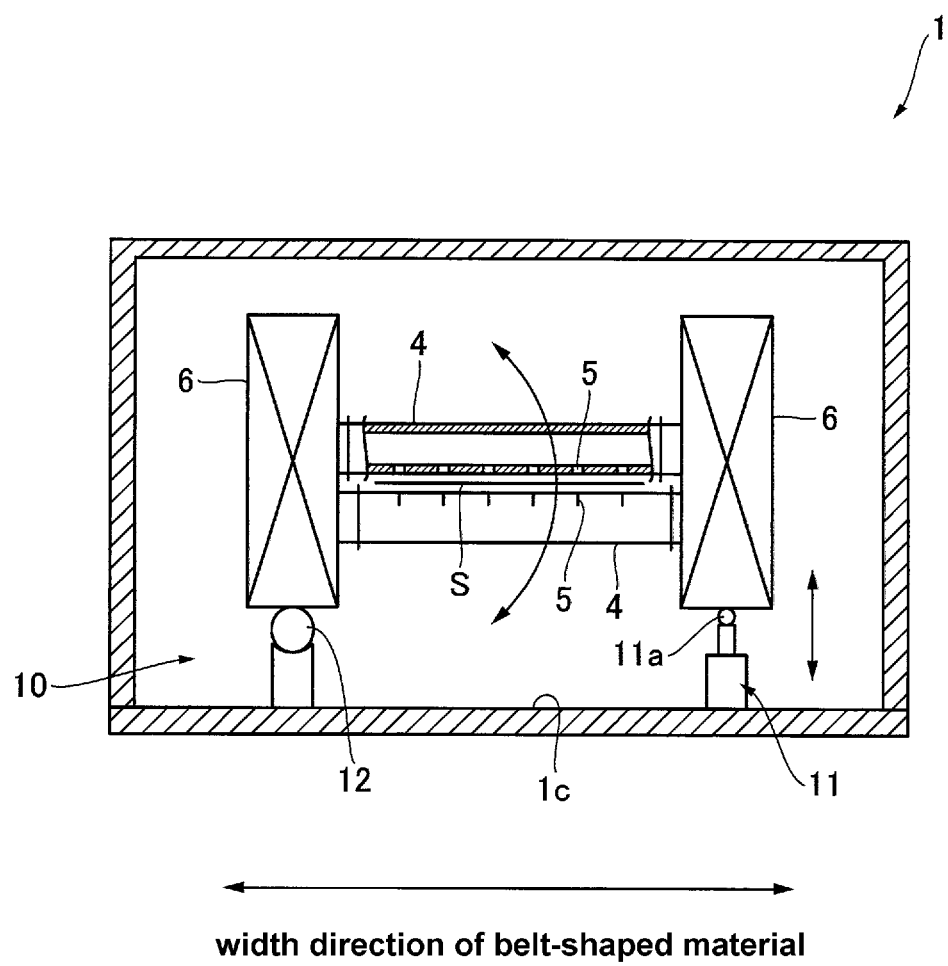
FIG. 5 is a sectional view that illustrates a modified example of the belt-shaped material conveying apparatus capable of correcting meandering, and corresponds to FIG. 2.

FIG. 5 illustrates a modified example of the above described example. FIG. 5 is a sectional view on arrow taken along line A-A and corresponds to FIG. 2. In the modified example, the tilt means 10 is configured by a rotation support point 12 that rotatably supports the support pad 4 via one of the gas ducts 6 at one side in the width direction of the belt-shaped material S, and the hydraulic cylinder 11 that displaces the support pad 4 while supporting the support pad 4 and rotates the support pad 4 around the rotation support point 12 via the other gas duct 6 at the other side in the width direction of the belt-shaped material S, instead of the above described pair of hydraulic cylinders 11.

The support pad 4 can be tilted around the rotation support point 12 by performing a contraction operation of the hydraulic cylinder 11, and the similar operational effect to the operational effect of the above described example can be obtained. The modified example can include only one hydraulic cylinder 11 as the force applying means, and therefore can be configured simply at low cost.

Figure 6:
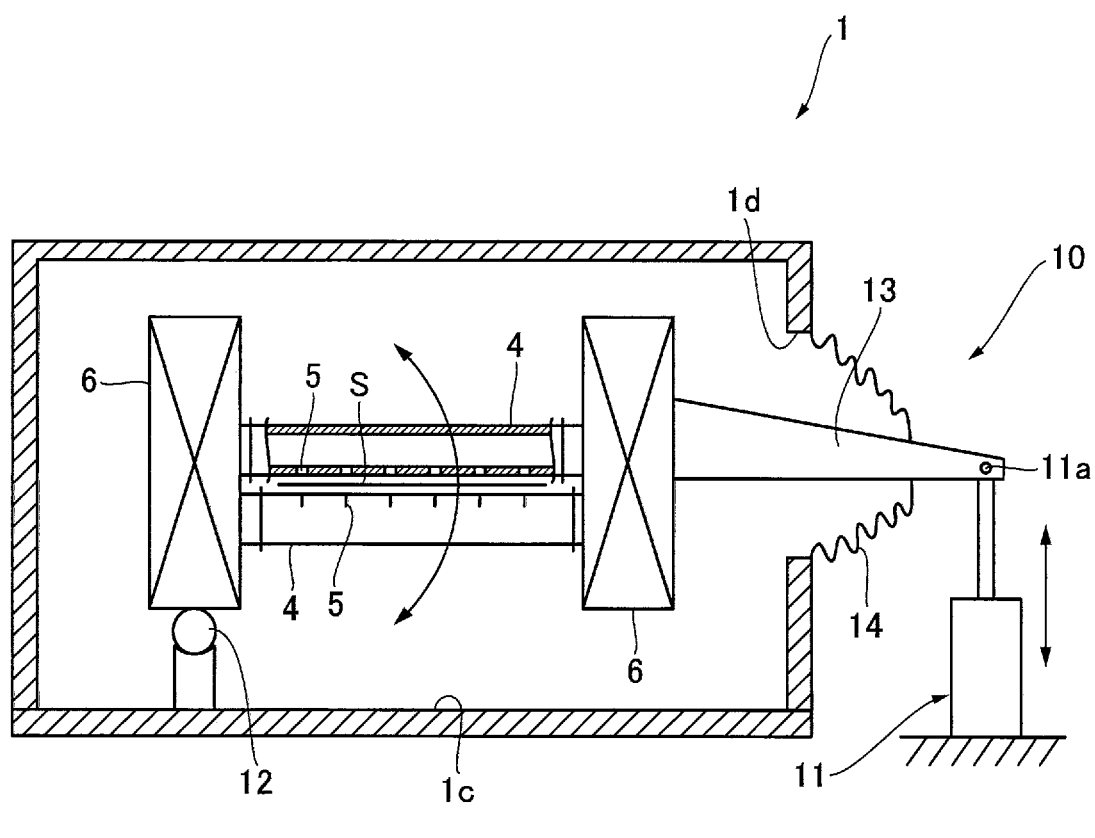
FIG. 6 is a sectional view that illustrates another modified example of the belt-shaped material conveying apparatus capable of correcting meandering, and corresponds to FIG. 2.
Figure 7:
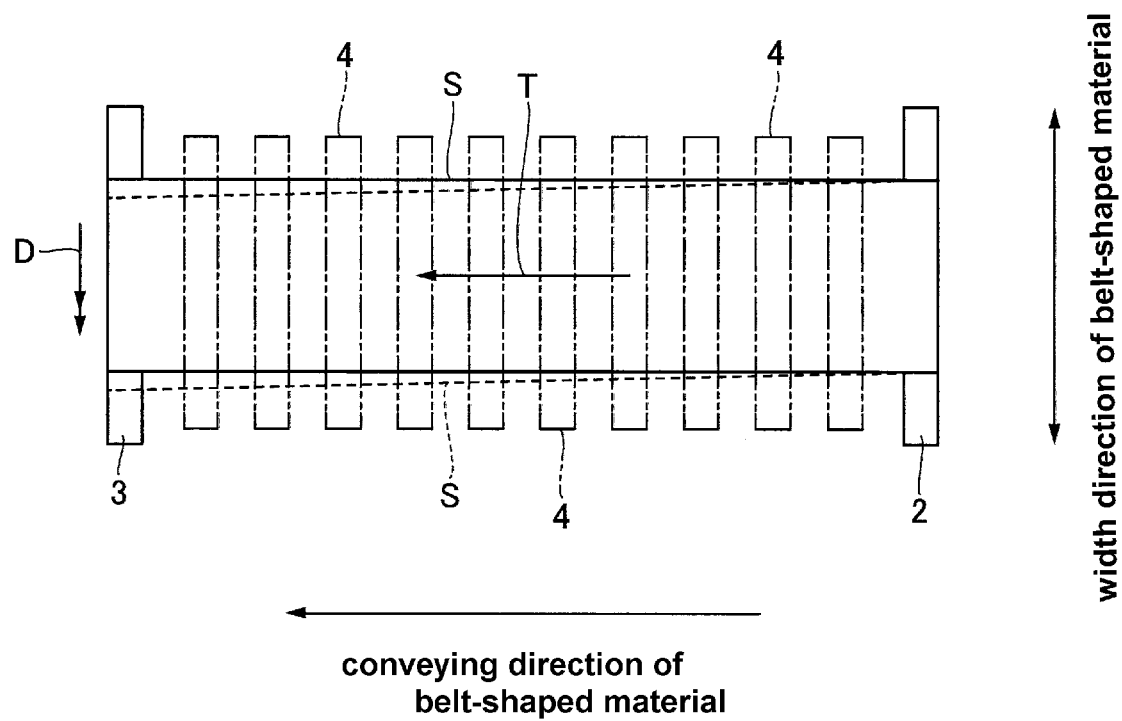
FIG. 7 is an explanatory view explaining a state in which the belt-shaped material displaces to a width direction of the belt-shaped material and causes meandering.

FIG. 6 illustrates another modified example of the above described example. FIG. 6 is also a sectional view on arrow taken along line A-A and corresponds to FIG. 2. In this modified example, based on the configuration illustrated in FIG. 5, the hydraulic cylinder 11 is installed outside of the heat treatment furnace 1. The support pad 4 is supported by the rotation support point 12 via one of the gas ducts 6 at one side in the width direction of the belt-shaped material S, and is supported by the hydraulic cylinder 11 which is subjected to a contraction operation via a lever 13 connected to the other gas duct 6 at the other side in the width direction of the belt-shaped material S.

The lever 13 is rotatably connected to the hydraulic cylinder 11 with a rotary joint 11a provided at an upper end of the hydraulic cylinder 11, and is oscillated in accordance with a contraction movement of the hydraulic cylinder 11. In a hole 1d through which the lever 13 penetrates the heat treatment furnace 1, a bellows 14 that closes the hole 1d while allowing oscillation of the lever 13 is provided. In the modified example like this, the operational effect similar to the operational effect of the above described example can be also ensured. In the modified example, the hydraulic cylinder 11 can be installed outside of the heat treatment furnace 1 so that maintenance of the hydraulic cylinder 11 can be easily performed.

Further, with reference to FIG. 1, another modified example will be described. In the above described example, the gas ducts 6 are included by being divided into two at the inlet port 1a side and the outlet port 1d side of the heat treatment furnace 1, and the plurality of support pads 4 connect to the respective gas ducts 6 which are divided into two, but as illustrated by dividing the gas duct 6 by dotted lines X in FIG. 1, a support pad module 15 is configured by setting a pair of support pads 4 facing the top surface side and the undersurface side of the belt-shaped material S as one set along the conveying direction T of the belt-shaped material S, and providing the gas ducts 6 individually at the respective sets, and the support pads 4 may be individually tilted in the individual support pad modules 15. In this case, the gas ducts 6 of the adjacent support pad modules 15 may connect to each other with an expansion joint or the like.

In this way, tilts of the support pad modules 15 are gradually increased and decreased along the conveying direction T of the belt-shaped material S, and a twist amount generated in the belt-shaped material S can be gradually changed so that meandering can be corrected while equal and uniform stress states are ensured more properly.

The method can be adopted to not only when the support pad modules 15 are connected with expansion joints or the like, but also when the gas duct 6 is divided into two or three or more as described above.

On the other hand, as illustrated in ranges of alternate long and short dash lines Y in FIG. 1, the tilt means 10 may be provided only in the support pads 4 at the feeding side located closely to the feed roll 2 side and the support pads 4 at the wind-up side located closely to the wind-up roll 3 side. In this way, meandering can be also corrected by generating twists in the belt-shaped material S only in a vicinity of the inlet port 1a side and in a vicinity of the outlet port 1b side of the heat treatment furnace 1.

In this case, the configuration of the aforementioned support pad module 15 is preferably adopted. Alternatively, the hydraulic cylinders 11 and the like may be directly provided at the support pad 4 instead of being provided at the gas ducts 6. In this case, the support pad 4 and the gas ducts 6 may be connected via flexible joints to absorb movement of the support pad 4.

In these modified examples illustrated in FIG. 1, the operational effects similar to the operational effects of the above described example can be ensured as a matter of course.

Further, by configuring the support pad 4 to be exchangeable and movable with respect to the gas duct 6 so that the space between the support pad 4 at the upper side and the support pad 4 at the lower side can be changed, whereby the support pads 4 can be caused to respond to change of the thickness and material of the belt-shaped material S. Further, by also configuring the gas duct 6 to be exchangeable and movable with respect to the furnace floor 1c, the support pads 4 can be caused to respond to change in a width dimension of the belt-shaped material S.

The invention claimed is:

1. A belt-shaped material conveying apparatus that supports a belt-shaped material conveyed in a conveying direction to a carrying-out side from a carrying-in side in a noncontact state by it streams spouted to the belt-shaped material from support pads disposed to face a front surface side and a back surface side of the belt-shaped material respectively, comprising:
   tilt means that tilts at least any one of the support pads in a width direction of the belt-shaped material crossing the conveying direction of the belt-shaped material,
   wherein, in the support pad, a pair of gas ducts placed at both sides in the width direction of the belt-shaped material and supply gas to the support pad connect to both sides in a width direction of the support pad, and the tilt means connects to undersurfaces of the gas ducts, and
   the gas ducts are divided along the conveying direction of the belt-shaped material, the gas ducts connect to each other by an expansion joint, and the respective gas ducts connect to a plurality of the support pads.

2. The apparatus according to claim 1,
   wherein a support pad module is configured by setting at least a pair of the support pads facing the front surface side and the back surface side of the belt-shaped material as one set, and by the gas ducts being individually connected to these respective sets, along the conveying direction of the belt-shaped material, and
   the gas ducts of the support pad modules adjacent to each other connect with an expansion joint.

3. The apparatus according to claim 1, wherein the tilt means is included by only the support pad at the carrying-in side positioned closely to the carrying-in side and the support pad at the carrying-out side positioned closely to the carrying-out side.

4. The apparatus according to claim 1, wherein the tilt means is configured by a pair of force applying means that displaces the support pad in opposite directions of each other at both sides in the width direction of the belt-shaped material.

5. The apparatus according to claim 1, wherein the tilt means is configured by a rotation support point that rotatably supports the support pad at one side in the width direction of the belt-shaped material, and force applying means that displaces the support pad at the other side in the width direction of the belt-shaped material to rotate the support pad around the rotation support point.

6. The apparatus according to claim 2, wherein the tilt means is configured by a pair of force applying means that displaces the support pad in opposite directions of each other at both sides in the width direction of the belt-shaped material.

7. The apparatus according to claim 3, wherein the tilt means is configured by a pair of force applying means that displaces the support pad in opposite directions of each other at both sides in the width direction of the belt-shaped material.

8. The apparatus according to claim 2, wherein the tilt means is configured by a rotation support point that rotatably supports the support pad at one side in the width direction of the belt-shaped material, and force applying means that displaces the support pad at the other side in the width direction of the belt-shaped material to rotate the support pad around the rotation support point.

9. The apparatus according to claim 3, wherein the tilt means is configured by a rotation support point that rotatably supports the support pad at one side in the width direction of the belt-shaped material, and force applying means that displaces the support pad at the other side in the width direction of the belt-shaped material to rotate the support pad around the rotation support point.

* * * * *